United States Patent
Krishnamurthy S et al.

(10) Patent No.: US 11,989,086 B2
(45) Date of Patent: May 21, 2024

(54) OPTIMIZING RUNTIME SYSTEM OPERATION VIA PRE-BOOT SYSTEM ANALYSIS

(71) Applicant: DELL PRODUCTS L.P., Round Rock, TX (US)

(72) Inventors: Srikanth Krishnamurthy S, Bangalore (IN); Ibrahim Sayyed, Georgetown, TX (US); Amit K Tiwari, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 55 days.

(21) Appl. No.: 17/966,650

(22) Filed: Oct. 14, 2022

(65) Prior Publication Data

US 2024/0126637 A1 Apr. 18, 2024

(51) Int. Cl.
*G06F 11/07* (2006.01)
*G06F 11/14* (2006.01)

(52) U.S. Cl.
CPC ...... *G06F 11/0793* (2013.01); *G06F 11/1417* (2013.01)

(58) Field of Classification Search
CPC .............. G06F 11/0793; G06F 11/1417
USPC .............................................. 714/15
See application file for complete search history.

(56) References Cited

U.S. PATENT DOCUMENTS

| 8,468,334 | B1* | 6/2013 | Jonna ............ G06F 9/4403 713/1 |
| 11,157,349 | B2 | 10/2021 | Shah et al. |
| 11,307,844 | B2 | 4/2022 | Sayyed et al. |
| 11,334,419 | B1 | 5/2022 | Suryanarayana et al. |
| 11,347,856 | B2 | 5/2022 | Sayyed et al. |

* cited by examiner

*Primary Examiner* — Yair Leibovich
(74) *Attorney, Agent, or Firm* — Larson Newman, LLP

(57) ABSTRACT

If a critical event occurs during a boot process, an information handling system may analyze firmware associated with the critical event to determine whether the firmware is unified extensible firmware interface compliant. In response to determining that the firmware is not unified extensible firmware interface compliant, the system may retrieve a rule associated with the firmware, and apply one or more actions to the information handling system based on the rule.

20 Claims, 7 Drawing Sheets

OPTIMIZING RUNTIME SYSTEM OPERATION VIA PRE-BOOT SYSTEM ANALYSIS

FIELD OF THE DISCLOSURE

The present disclosure generally relates to information handling systems, and more particularly relates to optimizing the runtime system operation via pre-boot system analysis.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

If a critical event occurs during a boot process, an information handling system may analyze firmware associated with the critical event to determine whether the firmware is unified extensible firmware interface compliant. If the firmware is not unified extensible firmware interface compliant, the system may retrieve a rule associated with the firmware, and apply one or more actions to the information handling system based on the rule.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
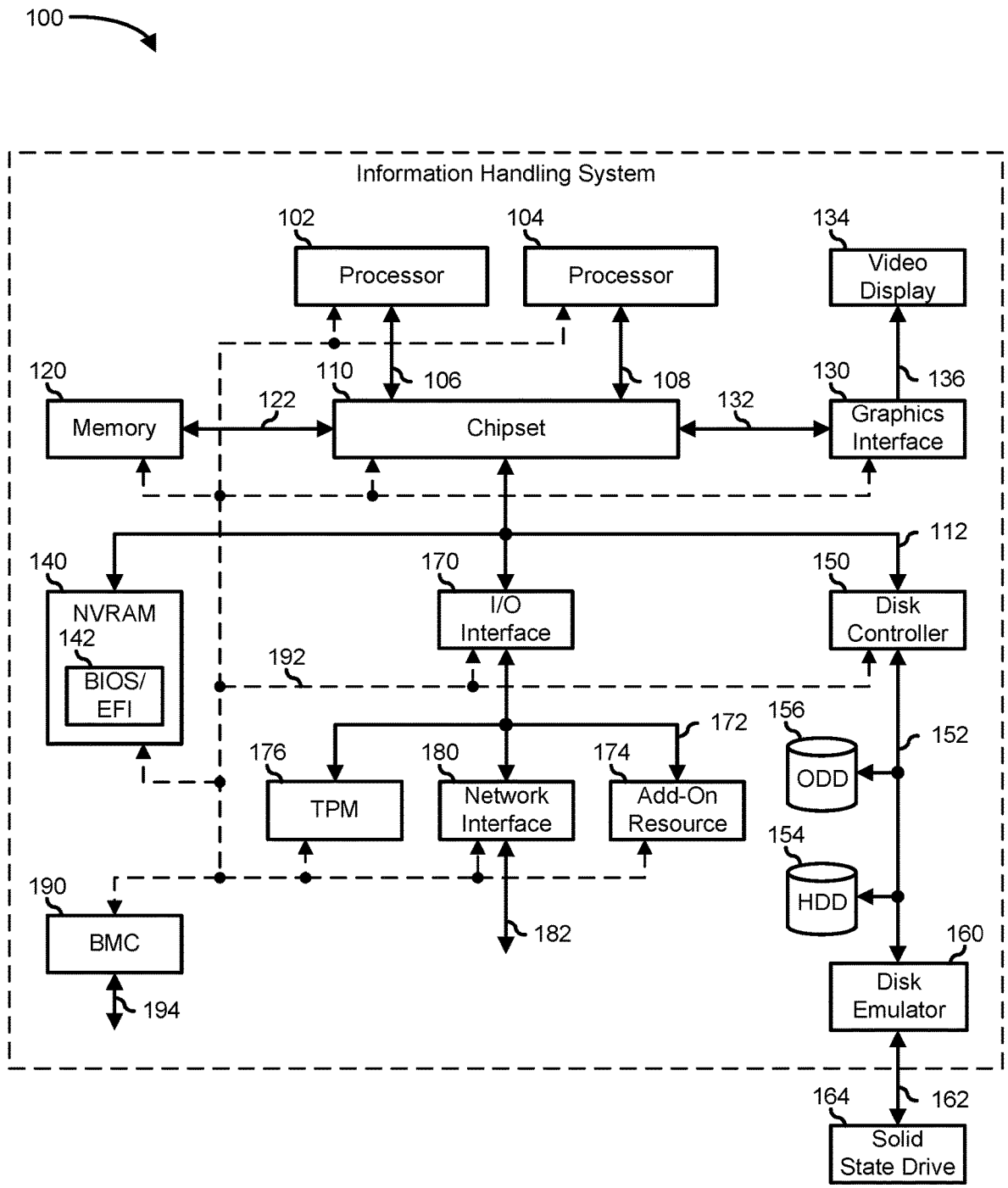
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a double data rate (DDR) memory channel and memory 120 represents one or more DDR dual in-line memory modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as dynamic random access memory (DRAM) DIMMs, static random access memory (SRAM) DIMMs, non-volatile DIMMs (NV-DIMMs), storage class memory devices, read-only memory (ROM) devices, or the like. Graphics adapter 130 is connected to chipset 110 via a graphics interface 132 and provides a video display output 136 to a video display 134. An example of a graphics interface 132 includes a peripheral component interconnect-express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a high-definition multimedia interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface, a universal serial bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or an add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Information handling systems typically incur issues when there is inconsistency in configuration or BIOS settings. These issues may affect one or more software applications that sometimes results in a system crash. For example firmware may be deemed Windows® security mitigations table (WSMT) compatible but is not, such as when the firmware has invalid or non-existent entries in a differential system description table. Such issue may cause an invalid memory exception or system crash for example. Thus, a system and method to detect and/or diagnose compliance of firmware to one or more specifications such as compliance to WSMT requirements prior to loading the operating system are desirable. In addition, when non-compliance to the specification is detected, the present disclosure provides the ability to prevent an operating system crash, which is useful for consumers. Accordingly, the ability to monitor specification compliance before the hand-off to the operating system may be appropriate. To address this and other issues, the present disclosure provides a system and method to optimize runtime system operation via pre-boot fault analysis.

Figure 2:
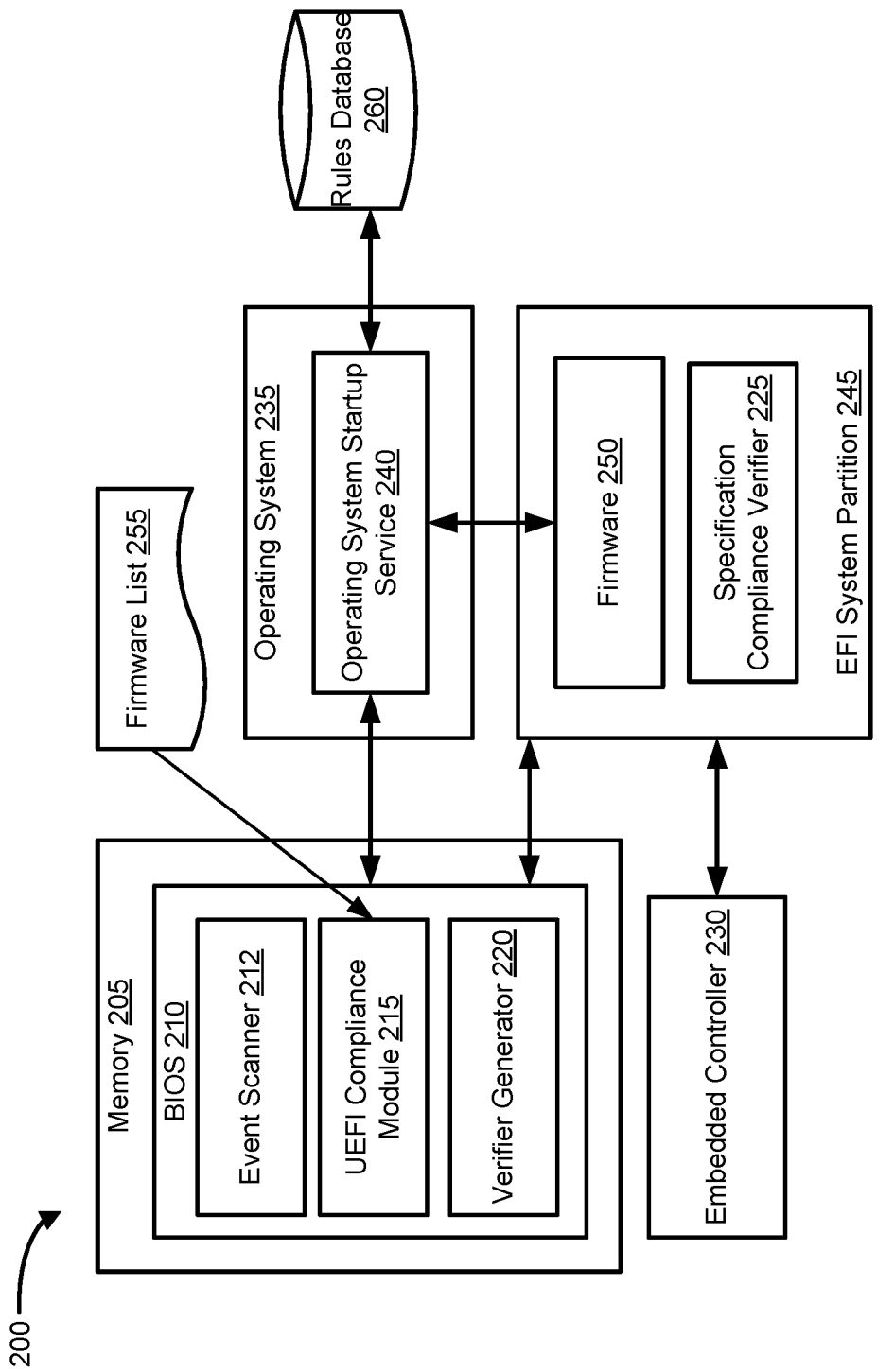
FIG. 2 is a block diagram illustrating a system to optimize runtime system operation via pre-boot system analysis, according to an embodiment of the present disclosure.

FIG. 2 shows a system 200 for optimizing the runtime system operation via pre-boot system analysis. System 200 includes a memory 205, an operating system 235, an EFI system partition, and a rules database 260. Memory 205, which is similar to NVRAM 140 of FIG. 1, includes BIOS 210 which is similar to BIOS/EFI 142 of FIG. 1. BIOS 210 includes an event scanner 212, a unified extensible firmware interface (UEFI) compliance module 215, and a verifier generator 220. Operating system 235 includes an operating system startup service 240 while EFI system partition 245 includes a firmware 250 and a specification compliance verifier 225 which was generated by verifier generator 220. EFI system partition 245 may be part of an HDD, ODD, SSD, or similar.

At boot device selection (BDS) phase of the boot process, event scanner 212 may be configured to monitor or scan the information handling system for critical events that may have been raised by BIOS 210 during the boot process. Examples of critical events include BIOS_CONFIG_EVENT, BIOS_DEVICE_CHANGE_EVENT, BIOS_SECURITY_EVENT, BIOS_FW_UPDATE_EVENT, and BIOS_FW_RECOVERY_EVENT. For example, the BIOS_CONFIG_EVENT may be raised if there is a change in BIOS configuration. The BIOS_DEVICE_CHANGE_EVENT may be raised if a change is detected when loading the components or devices. BIOS_FW_UPDATE_EVENT may be raised if a firmware is updated and BIOS_FW_RECOVERY_EVENT may be raised if a firmware has been recovered. For example, the method in response to determining that the firmware has been updated may determine whether the updated firmware is UEFI compliant. In response to determining that the updated firmware is not UEFI compliant, rolling back the updated firmware to an older version. If a critical event is detected, the critical event may be parsed to determine the associated firmware such as a firmware payload or image. After determining the associated firmware, a specification compliance verifier associated with that firmware may be generated by verifier generator 220. The specification compliance verifier 225 may then determine whether the firmware is UEFI compliant.

When firmware 250 is updated with a new version, a firmware list 255 may be updated. Firmware list 255 includes a mapping of firmware to run indicators, wherein each firmware may have an associated run indicator. The run indicator may indicate whether a critical event associated with the firmware is detected. For example, each firmware may be mapped to a run indicator with a value of zero or false initially. When the firmware is updated to a new version, then the run indicator may be updated to true or one. During the BDS phase, UEFI compliance module 215 may query firmware list 255 to determine if there is a firmware to be evaluated or checked by a specification compliance verifier for UEFI compliance. For example, the UEFI compliance module 215 may determine that the firmware may be analyzed for UEFI compliance if its run indicator is set to true or one. If the run indicator is set to zero or false, then the specification verifier may not verify whether the firmware is UEFI compliant. UEFI compliance module 215 may locate the firmware to be evaluated in the EFI system partition and loads the firmware before the BIOS boots to the host operating system.

Determining whether the firmware is UEFI compliant includes determining whether the firmware is compliant with UEFI and/or advanced configuration and power interface (ACPI) requirements as defined in the UEFI specification and ACPI specification accordingly. UEFI compliance also includes determining compliance with WSMT specification and other requirements. In one example, specification compliance verifier 225 may determine whether firmware 250 has issues with runtime interfaces that carry a system variable. An issue identifier may be generated when an issue or discrepancy is found by the specification compliance verifier 225. The issue identifier may also be generated when a critical event is detected and/or generated by BIOS 210. Specification compliance verifier 225 may log, collect, and store telemetry data generated during the verification process. The issue identifier along with the telemetry data may be stored in a non-volatile storage such as EFI system partition 245 and/or rules database 260.

After the boot process, operating system startup service 240 may be initiated. The operating system startup service may then query EFI system partition 245 and/or rules database 260 for a rule or set of rules associated with the issue identifier. Operating system startup service 240 may then push one or more rules to embedded controller 230 via a memory-mapped I/O (MMIO). A rule may include one or more actions which may then be applied by embedded controller 230 to address the issue associated with the event and/or firmware. For example, embedded controller 230 may initiate an operating system-specific runtime UEFI payload that is configured to verify the interfaces associated with the firmware is UEFI compliant before loading it. In addition, the embedded controller may handle/fix the firmware if the firmware is not UEFI compliant, such as adding a missing system variable and populating it with a default value. Further, embedded controller 230 may mute one or more communication paths where the operating system collects telemetry. Embedded controller 230 may perform other actions to avoid a system crash. After performing the actions, the events raised may be removed and a status associated with the issue identifier be set to completed or handled.

Figure 3:
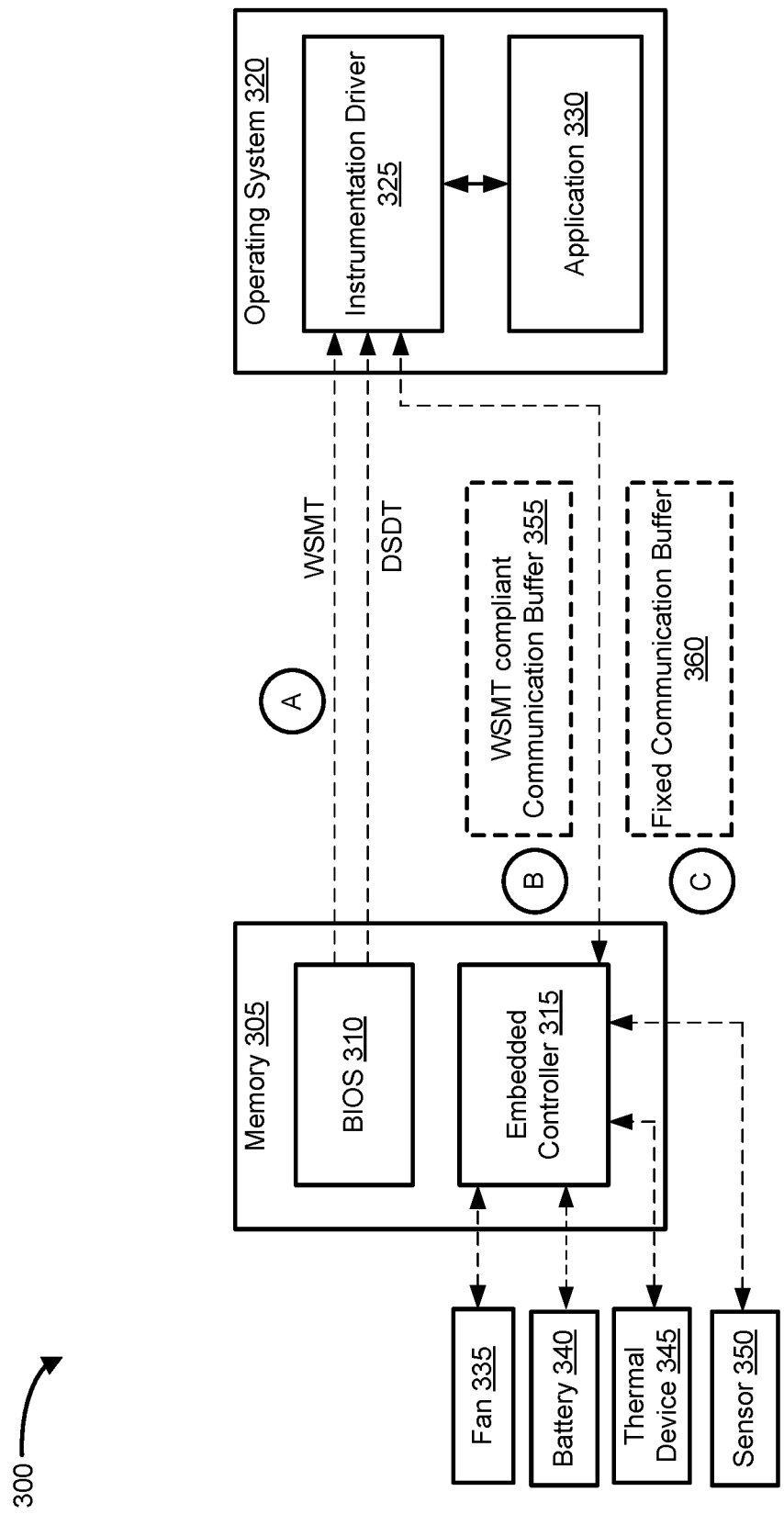
FIG. 3 is a block diagram illustrating a system to optimize runtime system operation via pre-boot system analysis, according to an embodiment of the present disclosure.

FIG. 3 shows a block diagram of a system 300 for optimizing the runtime system operation via pre-boot system analysis. System 300 includes a memory 305, an operating system 320, a fan 335, a battery 340, a thermal device 345, and a sensor 350. Operating system 320 includes an instrumentation driver 325 and an application 330. Memory 305, which is similar to NVRAM 140 of FIG. 1, includes BIOS 310 and embedded controller 315. In one embodiment, memory 305 may be SPI flash memory. BIOS 310, which is similar to BIOS/EFI 142 of FIG. 1, may be configured to validate WSMT and differentiated system description table (DSDT) requirements based on ACPI specification.

Various devices, such as fan 335, battery 340, thermal device 345, and sensor 350 have firmware and/or drivers that communicate with embedded controller 315. For example, instrumentation driver 325 provides system management information to and from drivers and/or firmware via embedded controller 315 using an input/output control system call. Instrumentation driver 325 also communicates system management information to application 330 which may use the device driver. In addition, embedded controller 315 may be configured to apply one or more actions that are based on one or more policies to the various devices.

FIG. 3 is annotated with a series of letters A, B, and C. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, BIOS 310 may determine whether the firmware and/or drivers of the various devices are UEFI and/or ACPI specification compliant. For example, BIOS 310 may determine whether one or more tables associated with the firmware and/or drivers, such as WSMT and DSDT are properly populated. Otherwise, the WSMT and DSDT entries are fixed, such as adding entries and populating the added entries with default values. At stage B, a WSMT-compliant communication buffer 355 may be defined based on a support database (SDB) address and SDB size entries in the DSDT. If these entries are determined to be missing in the DSDT, they may also be added dynamically. At stage C, the WSMT-compliant communication buffer which may have been fixed in stage B is created and may be used in instances where the WSMT is disabled resulting in a fixed communication buffer 360.

Figure 4:
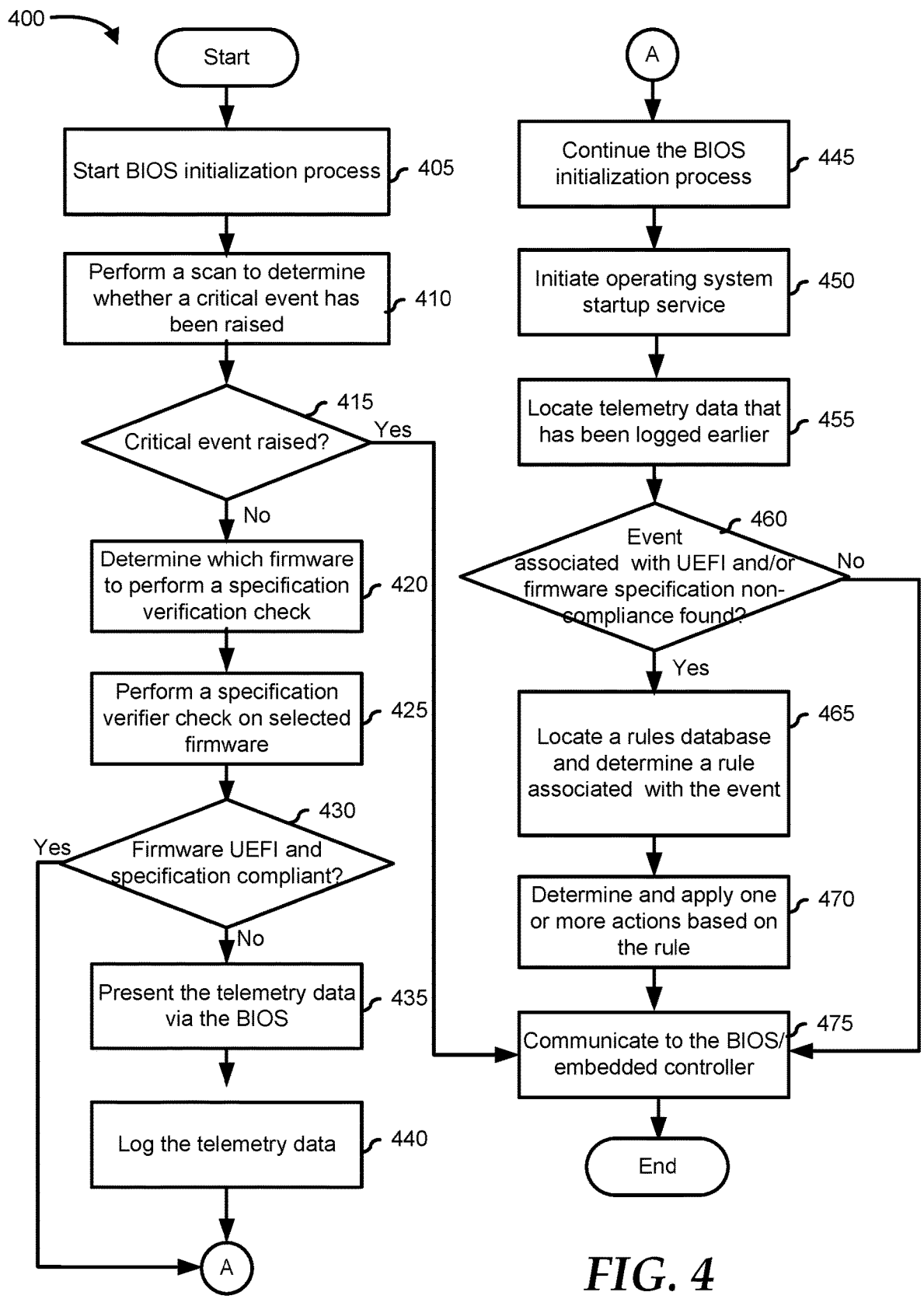
FIG. 4 is a flowchart illustrating a method to optimize runtime system operation via pre-boot system analysis, according to an embodiment of the present disclosure.

FIG. 4 shows a flow chart of a method 400 for optimizing the runtime system operation via pre-boot system analysis. The analysis may be performed based on BIOS-generated critical events. At block 405, the information handling system may be powered on or booted and a BIOS initialization process is started. A portion of the BIOS initialization code may be used by the information handling system to test its hardware, and connectivity, and to load the operating system. The BIOS initialization code may be stored in memory, such as a serial peripheral interface or flash memory. The BIOS initialization process includes several phases, such as the security phase, pre-EFI initialization phase, driver execution environment (DXE) phase, BDS phase, and runtime services.

At block 410, the BIOS initialization process may have reached the DXE phase. During the late stages of the DXE phase and/or during the BDS phase, the method may initiate a scan of critical events raised by the BIOS earlier in the BIOS initialization process. The scan of the critical events may commence after the BIOS components are loaded. A critical event may be raised by BIOS when there is an issue encountered while loading a component. The critical event may be also a UEFI compliance issue, an ACPI event, an ACPI compliance issue, or similar.

At decision block 415, the method determines whether a critical event has been raised. If a critical event has been raised, then the method takes the "YES" branch and proceeds to block 475. If a critical event has not been raised, then the method takes the "NO" branch and proceeds to block 420. At block 420, the method may determine if there is firmware to be verified for UEFI compliance. For example, the method may deem that firmware is to be verified if the firmware has been updated with a new version at the last boot process. The method may also deem that a particular firmware has to be verified if the BIOS has identified a critical event and/or has raised an alarm. In another example, a UEFI compliance module may determine the value of a run indicator that is mapped to the firmware. Each firmware in the information handling system may be associated with a run indicator. The run indicator may be a flag that may be used to indicate the occurrence of a critical event associated with the firmware. The run indicator may also be used to indicate whether the firmware should be verified for UEFI compliance.

At block 425, the method performs a firmware specification compliance check for each of the firmware identified in block 420. For example, the method may check the firmware for ACPI compliance along with system variables of the firmware pre-boot and/or runtime interface(s) for discrepancies. The method may also check the memory variables associated with the firmware. UEFI and/or firmware non-compliance may include deviation or violation of the UEFI or firmware specification.

At decision block 430, the method determines whether the firmware is UEFI compliant and compliant with its firmware specification. If the firmware is UEFI and firmware specification compliant, then the method takes the "YES" branch and proceeds to block 445. If the firmware is not UEFI and firmware specification compliant, then the method takes the "NO" branch and proceeds to block 435.

At block 435, the method may present telemetry data associated with non-compliance with the UEFI or firmware specification via the BIOS. In addition, the method may generate an issue identifier that represents non-compliance. The issue identifier may be a globally unique identifier and presented to the operating system startup service and stored in an EFI system partition. The telemetry data may include information associated with the non-compliance. For example, the telemetry data may include information on whether an SDB address and/or SDB size is missing from the DSDT.

At 440, the method logs or stores the telemetry data in a non-volatile storage device, such as an EFI system partition. At block 445, the method continues the BIOS initialization process. At block 450, the method initiates the operating system startup service. At block 455, the method may locate the telemetry data that has been logged or stored in the non-volatile storage device. For example, a query for the telemetry data that has been logged during the boot process may be performed.

At decision block 460, the method determines whether a critical event associated with the UEFI and/or firmware specification non-compliance is found. If a critical event is found, then the method takes the "YES" branch and proceeds to block 465. If a critical event is not found, then the method takes the "NO" branch and proceeds to block 475. At block 465, the method locates a rules database associated with BIOS critical events and determines a rule or set of rules associated with the event. The method may also determine a policy or set of policies associated with the event. The method may determine whether to apply one or more than one rule or policy. For example, the method may determine to apply the most restrictive rule. The method may also determine not to apply a rule. At block 470, the method determines and applies one or more actions based on the rule or set of rules determined in block 465. For example, the method may rebuild a DSDT table with default values. The method may also block the communication channel used by the firmware. At block 475, the method communicates information associated with the event, rule, and/or action(s) taken to the BIOS and/or embedded controller.

Figure 5:
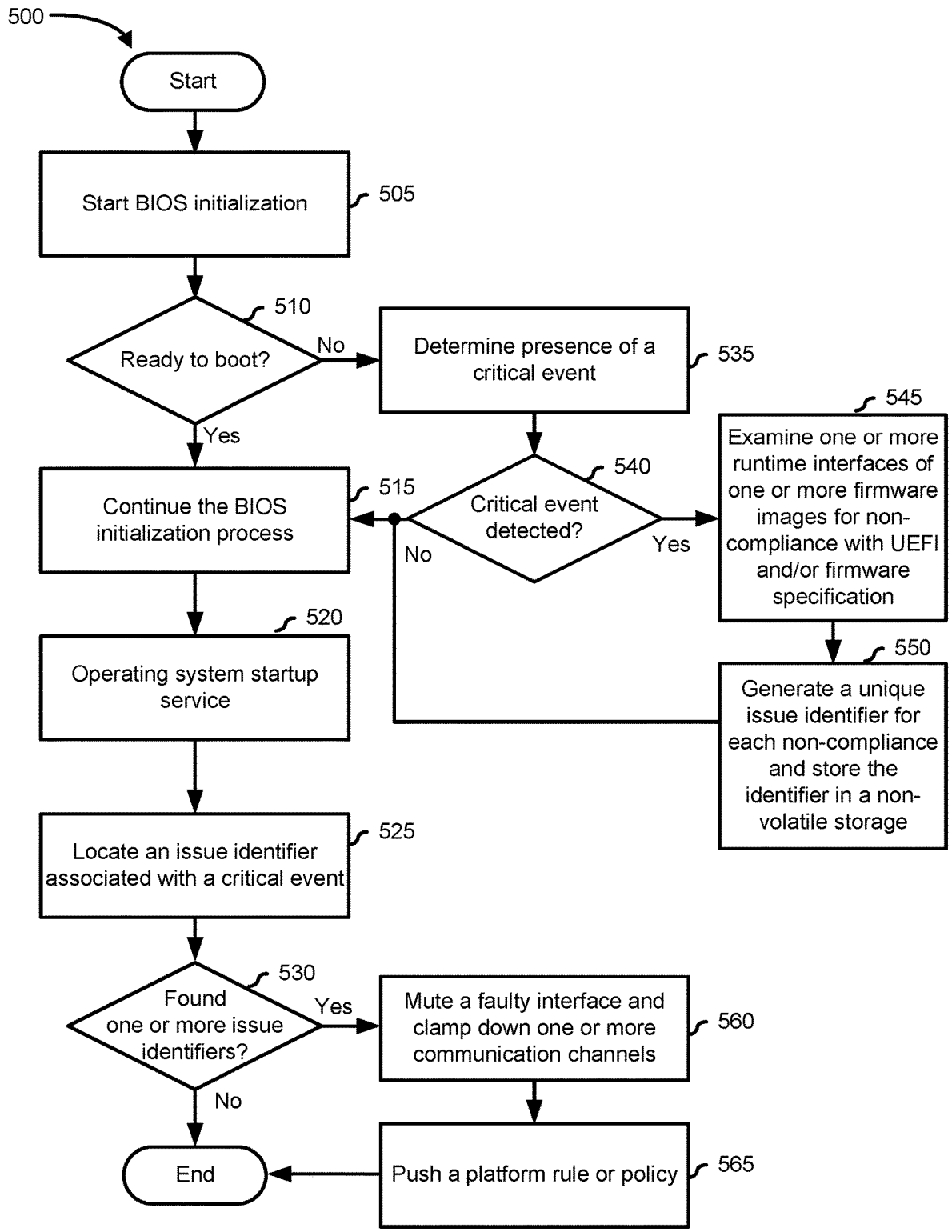
FIG. 5 is a flowchart illustrating a method to optimize runtime system operation via pre-boot system analysis, according to an embodiment of the present disclosure.

FIG. 5 shows a flow chart of a method 500 for optimizing the runtime system operation via pre-boot system analysis. The analysis may be performed based on BIOS-generated critical events. At block 505, the information handling system may be powered on or booted and a BIOS initialization process is started. At decision block 510, the method determines whether the information handling system is ready to boot. If the method determines that the information handling system is ready to boot, then the method takes the "YES" branch and proceeds to block 515. If the information handling system is not ready to boot, then the method takes the "NO" branch and proceeds to block 535. At block 515, the method continues the BIOS initialization process and at block 520, the method initiates an operating system startup service.

At block 525, locate one or more issue identifiers associated with a critical event, wherein the identifiers may be stored in a non-volatile storage device, such as the EFI system partition. The issue identifiers may be globally unique identifiers generated at block 550. At decision block 530, the method determines whether one or more issue identifiers have been located. If one or more issue identifiers have been located, then the method takes the "YES" branch and proceeds to block 560. If there is no issue identifier found, then the method takes the "NO" branch and the method ends. At block 560, the method mutes a faulty interface associated with the issue. The method may also clamp down one or more communication channels associated with the issue or firmware. At block 565, the method may push a platform rule or procedure associated with the issue. The method may also push a default rule if an event is detected.

At block 535, the method may determine whether a critical event has been generated. For example, the method may determine the presence of a critical event inside a persistent space, such as a non-volatile storage device. At decision block 540, the method determines if a critical event is detected. If a critical event is detected, then the method takes the "YES" branch and proceeds to block 545. If there is no critical event detected, then the method takes the "NO" branch and the method proceeds to block 515.

At block 545, a pre-boot service loads and runs firmware image(s) at a BIOS and operating system crossing point to examine one or more firmware runtime interfaces for non-compliance with UEFI and/or firmware specifications. For example, the method may determine whether a firmware has an invalid entry in a differentiated system description table. A run identifier may be used in determining which of the firmware images are to be loaded. For example, the firmware image may be loaded if its run identifier is set to true or one, wherein the run identifier may be set to true or one if the firmware image has been updated. The run identifier may also be set to true if a critical event associated with the firmware image is detected. At block 550, for each of the events and/or UEFI or firmware specification non-compliance determined in block 545, the method may generate a unique issue identifier. The method may also store the issue identifier in a non-volatile storage device, such as an EFI system partition. The method proceeds to block 515.

Figure 6:
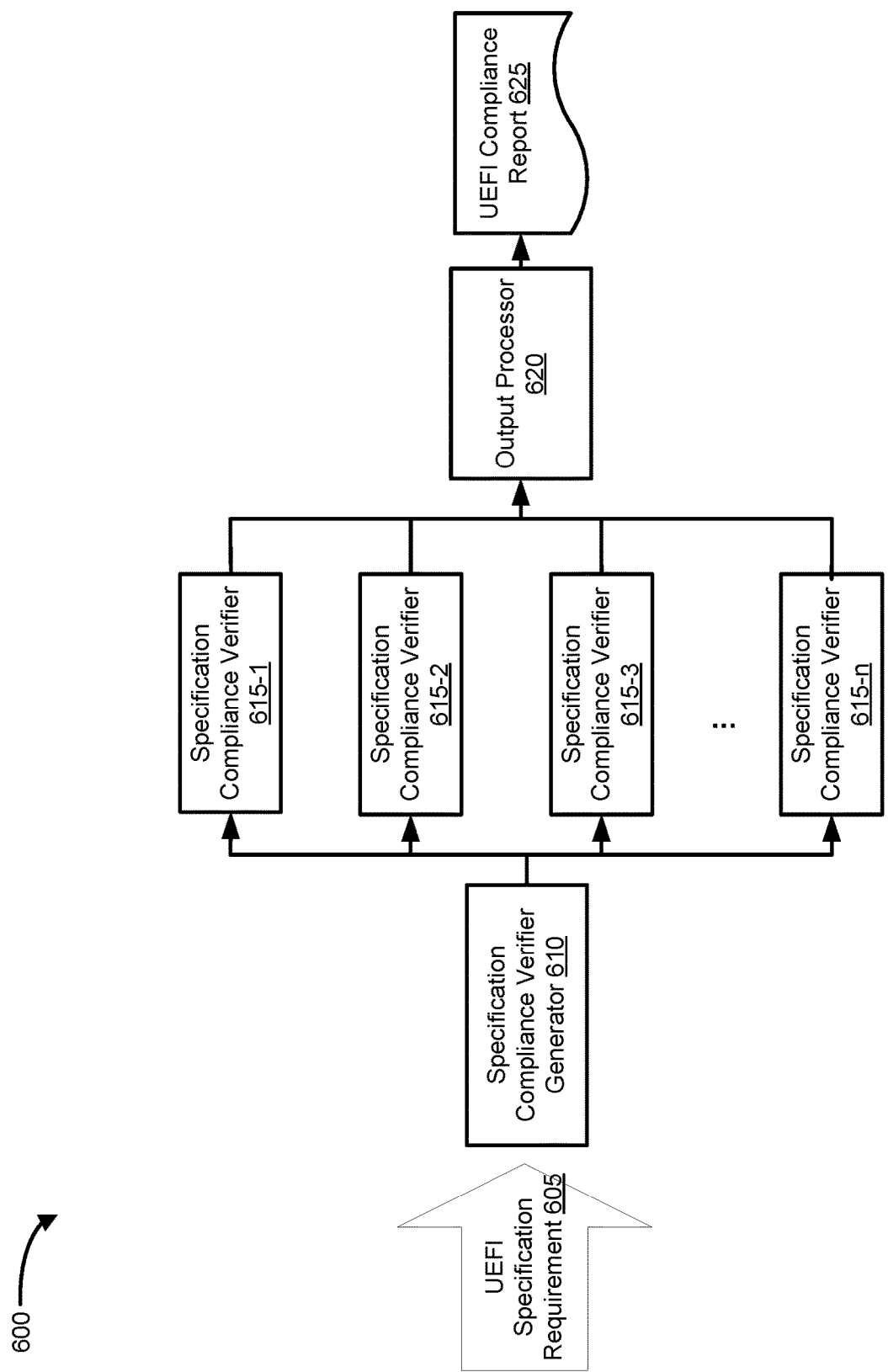
FIG. 6 is a block diagram illustrating a system for verifying compliance of a firmware to one or more firmware specifications, according to an embodiment of the present disclosure.

FIG. 6 shows a block diagram of a system 600 for verifying compliance of firmware payloads and/or images to one or more UEFI and/or firmware specifications. In this example, specification compliance verifier generator 610 may receive a UEFI specification requirement 605 that describes the structures and mechanisms of one or more firmware. For example, UEFI specification requirement 605 may include an ACPI specification. The ACPI specification may include ACPI tables such as a DSDT, persistent system description table, etc. UEFI specification requirement 605 may also include a firmware specification that describes interfaces, variables, and other mechanisms of a firmware.

Specification compliance verifier generator 610 may parse the UEFI specification requirement 605 and generate one or more specification compliance verifiers, such as specification compliance verifiers 615-1 through 615-n. For example, if specification compliance verifier generator 610 receives a trusted platform module (TPM) specification, it may generate a TPM specification compliance verifier. Other examples of specification compliance verifiers include ACPI table verifier, Intel ° micro-code verifier, system management BIOS (SMBIOS) table verifier, dynamic information and action gateway (DIAG) protocol API verifier, etc. The specification compliance verifiers may verify one or more components, parameters, variables, interfaces, etc. of the firmware in accordance with the UEFI and/or firmware specification.

Specification compliance verifiers 615-1 through 615-n, which are signed, may be configured to check or verify firmware for compliance with UEFI requirements. For example, the ACPI table verifier may determine whether a WSMT entry and associated DSDT entry of a firmware are filled out properly. The Intel® micro code verifier may determine the accuracy of the microcode and/or whether the latest vulnerability fix has been added. The TPM verifier may be configured to determine whether all the security features of the TPM are incorporated. The SMBIOS table may be configured to determine whether the SMBIOS table is properly populated. The DIAG protocol API verifier may be configured to determine whether the DIAG protocol APIs are included and properly implemented.

After performing the verification process, each one of specification compliance verifiers 615-1 through 615-n may generate a report. The report may include events and/or issues that were determined during the verification process. For example, the report generated by the ACPI table verifier may include DSDT read failure rates. The report may also include issue identifiers associated with each event or non-compliance detected. Each of the reports generated by specification compliance verifiers 615-1 through 615-n may be transmitted to output processor 620 for processing. For example, output processor 620 may parse the compliance report(s) received from specification compliance verifiers 615-1 through 615-n and consolidate the compliance report(s) into a UEFI compliance report 625. UEFI compliance report 625 may include a summary of the information on errors or issues detected by the specification verifiers, such as a UEFI requirement missing, non-compliance to a firmware speciation, etc. In another example, the specification may check the various contents of a firmware payload, such as an SMBIOS table, ACPI runtime methods, BIOS and operating system shared memory address space check, telemetry data table, embedded controller MMIO channel, etc. Based on the information, UEFI compliance report 625 may be used to trigger a warning, such as a critical event which may be used in determining corrective action. UEFI compliance report 625 may also be transmitted to other software applications, such as platform support or recovery system in the cloud.

As used herein, a hyphenated form of a reference numeral refers to a specific instance of an element and the un-hyphenated form of the reference numeral refers to the collective or generic element. Thus, for example, specification compliance verifier "615-1" refers to an instance of a specification compliance verifier class, which may be referred to collectively as specification compliance verifiers "615" and any one of which may be referred to generically as a specification compliance verifier "615."

Figure 7:
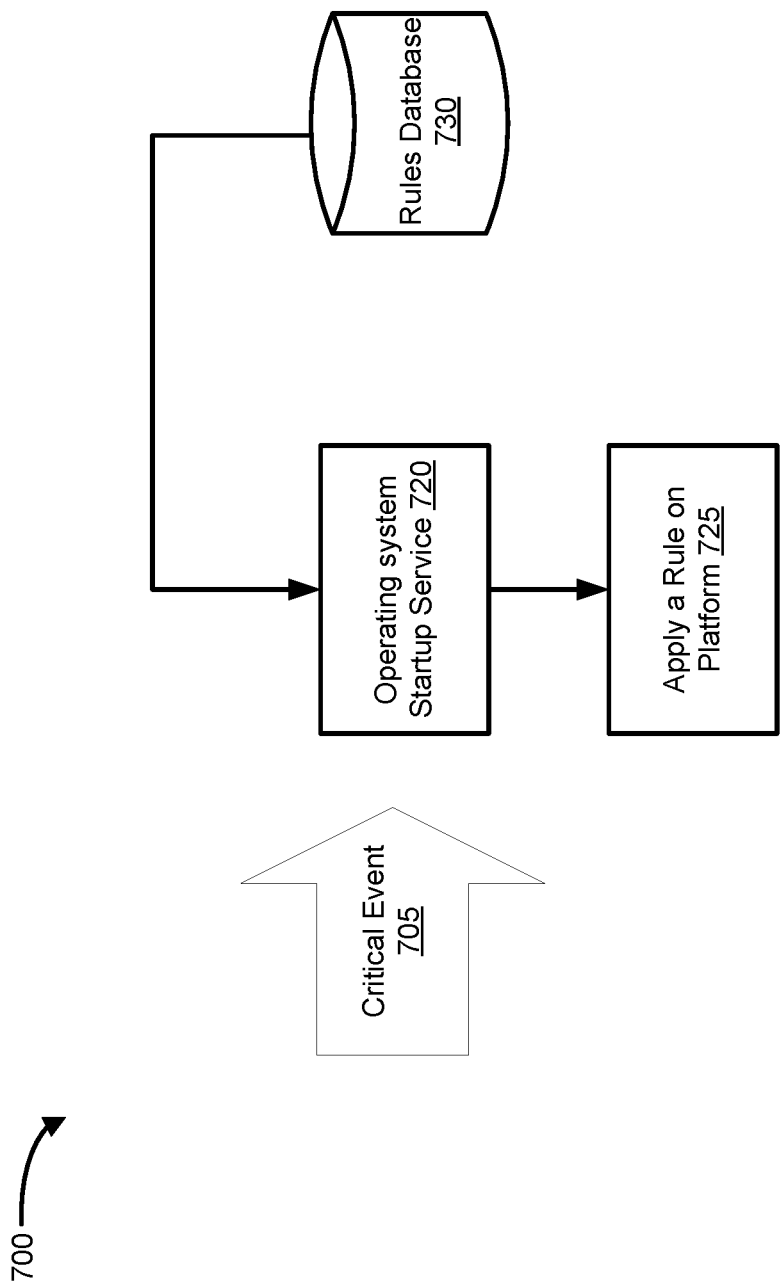
FIG. 7 is a block diagram illustrating a system for determining rules based on a critical event, according to an embodiment of the present disclosure.

FIG. 7 shows a block diagram of a system 700 for selecting and applying a rule or a set of rules in response to one or more critical events. System 700 includes an operating system startup service 720 and a rules database 730. Rules database 730 may include critical events generated by the BIOS. The events may include an issue that has risen due to non-compliance to a UEFI and/or firmware specification. Each issue may also be associated with a critical event. In addition, each issue may have an associated rule designed to apply an action to fix and/or mitigate the issue, wherein the rule is stored in rules database 730.

Operating system startup service 720 may be configured to monitor the platform for one or more critical events, such as a critical event 705. For each critical event, rules database 730 may be queried for a suitable rule. If more than one rule was found to be suitable, then operating system startup service 720 may determine which one of the rules is most favorable and apply that rule to the platform at block 725 through the embedded controller's runtime path. For example, the method may restrict at least one communication channel used by the firmware, such as the embedded controller and/or BIOS. The method may also restrict the WSMT upon user consent. In addition, the method may run the on-demand operating system diagnostics. The information handling system may be rebooted after the application of the rule. At this point, the issue may have been corrected.

For example, if the telemetry event showed a faulty DSDT, then operating system startup service 720 may choose a rule that would apply a fix to the faulty DSDT which if left unfixed, may cause a firmware to malfunction. Accordingly, at reboot, the faulty DSDT may have been corrected and no further telemetry event associated with this issue may be seen.

Method 400 and method 500 may be performed by one or more components of system 200 of FIG. 2 and system 300 of FIG. 3. However, while embodiments of the present disclosure are described in terms of system 200 of FIG. 2 and/or system 300 of FIG. 3, it should be recognized that other systems may be utilized to perform the described method. One of skill in the art will appreciate that each of the above flowcharts explains a typical example, which can be extended to advanced applications or services in practice.

In addition, although FIG. 4, and FIG. 5 show example blocks of method 400 and method 500 in some implementations, method 400 and method 500 may include additional blocks, fewer blocks, different blocks, or differently arranged blocks than those depicted in FIG. 4 and FIG. 5. Those skilled in the art will understand that the principles presented herein may be implemented in any suitably arranged processing system. Additionally, or alternatively, two or more of the blocks of method 400 and method 500 may be performed in parallel. For example, block 550 and block 555 of method 500 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Those of ordinary skill in the art will appreciate that the configuration, hardware, and/or software components of the systems depicted in the above figures may vary. For example, the illustrative components within the systems are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description. In addition, the components of the systems may be implemented in hardware, software, firmware, or any combination thereof. Further, connections between components may be omitted for descriptive clarity.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
monitoring an information handling system, by a processor, to detect a critical event during a boot process;
if the critical event is detected, then analyzing a firmware associated with the critical event to determine whether the firmware is unified extensible firmware interface compliant;
in response to determining that the firmware is not unified extensible firmware interface compliant, retrieving a rule associated with the firmware; and
applying one or more actions to the information handling system based on the rule.

2. The method of claim 1, wherein the monitoring of the information handling system is performed during a boot device selection phase of the boot process.

3. The method of claim 1, further comprising generating a unique issue identifier associated with the critical event.

4. The method of claim 1, further comprising storing telemetry data in a non-volatile storage device.

5. The method of claim 1, further comprising restricting at least one communication channel used by the firmware.

6. The method of claim 1, further comprising determining whether the firmware has an invalid entry in a differentiated system description table.

7. The method of claim 1, further comprising in response to determining that the firmware has been updated, determining whether the updated firmware is unified extensible firmware interface compliant.

8. The method of claim 7, further comprising in response to determining that the updated firmware is not unified extensible firmware interface compliant, rolling back the updated firmware.

9. An information handling system, comprising:
a processor; and
a memory device storing instructions that when executed cause the processor to perform operations including:
monitoring the information handling system to detect a critical event during a boot process;
if the critical event is detected, then analyzing a firmware associated with the critical event to determine whether the firmware is unified extensible firmware interface compliant;
in response to determining that the firmware is not unified extensible firmware interface compliant, retrieving a rule associated with the firmware; and
applying one or more actions to the information handling system based on the rule.

10. The information handling system of claim 9, wherein the monitoring of the information handling system is performed during a boot device selection phase of the boot process.

11. The information handling system of claim 9, the operations further comprising generating a unique issue identifier associated with the critical event.

12. The information handling system of claim 9, the operations further comprising storing telemetry data in a non-volatile storage device.

13. The information handling system of claim 9, the operations further comprising restricting at least one communication channel used by the firmware.

14. A non-transitory computer-readable medium to store instructions that are executable to perform operations comprising:
monitoring an information handling system to detect a critical event during a boot process;
if the critical event is detected, then analyzing a firmware associated with the critical event to determine whether the firmware is unified extensible firmware interface compliant;
in response to determining that the firmware is not unified extensible firmware interface compliant, retrieving a rule associated with the firmware; and
applying one or more actions to the information handling system based on the rule.

15. The non-transitory computer-readable medium of claim 14, wherein the monitoring of the information handling system is performed during a boot device selection phase of the boot process.

16. The non-transitory computer-readable medium of claim 14, further comprising generating a unique issue identifier associated with the critical event.

17. The non-transitory computer-readable medium of claim 14, wherein the operations further comprising storing telemetry data in a non-volatile storage device.

18. The non-transitory computer-readable medium of claim 14, wherein the operations further comprising restricting at least one communication channel used by the firmware.

19. The non-transitory computer-readable medium of claim 14, wherein the operations further comprising determining whether the firmware has an invalid entry in a differentiated system description table.

20. The non-transitory computer-readable medium of claim 14, wherein the operations further comprising in response to determining that the firmware has been updated, determining whether the updated firmware is unified extensible firmware interface compliant.

* * * * *